United States Patent

[11] 3,604,278

| [72] | Inventor | Wriston W. Hartsell<br>P. O. Box 308, Mary Esther, Fla. 32569 |
|------|----------|---|
| [21] | Appl. No. | 853,347 |
| [22] | Filed | Aug. 27, 1969 |
| [45] | Patented | Sept. 14, 1971 |

[54] ROTARY MOTION DEVICE
6 Claims, 2 Drawing Figs.

[52] U.S. Cl. .................................................. 74/52, 74/42
[51] Int. Cl. ............................................... F16h 37/12, F16h 21/18
[50] Field of Search .......................................... 74/42, 52

[56] References Cited
UNITED STATES PATENTS

| 2,394,269 | 2/1946 | Svete | 74/52 |
| 2,628,024 | 2/1953 | Greenwood, Jr. | 74/52 |
| 577,621 | 2/1897 | Kindermann | 74/52 |
| 637,020 | 11/1899 | Owen | 74/52 |
| 2,358,884 | 9/1944 | Stegall | 74/52 |

Primary Examiner—William F. O'Dea
Assistant Examiner—Wesley S. Ratliff, Jr.
Attorney—B. J. Powell ABSTRACT: A rotary motion device including a rotatably mounted shaft having a flywheel and two driven sun spur gears mounted thereon. Two driving planetary spur gears are mounted for rotation about the shaft while each is in mesh with one of the driven sun gears. Each of the driving planetary gears is rotated by a pair of driving arms connected to the planetary spur gear by a pair of driving rods and the relative position of each pair of driving arms is maintained by a spring urged positioning linkage.

PATENTED SEP 14 1971

3,604,278

INVENTOR
WRISTON W. HARTSELL
Newton, Hopkins, & Ormsby
ATTORNEYS

ROTARY MOTION DEVICE

This invention relates to a rotary motion device that may be used to power devices once set in motion. The invention is simple in construction and easy to maintain.

These features and advantages of the invention will become more clearly understood upon consideration of the following detailed description and accompanying drawing wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figure 1:
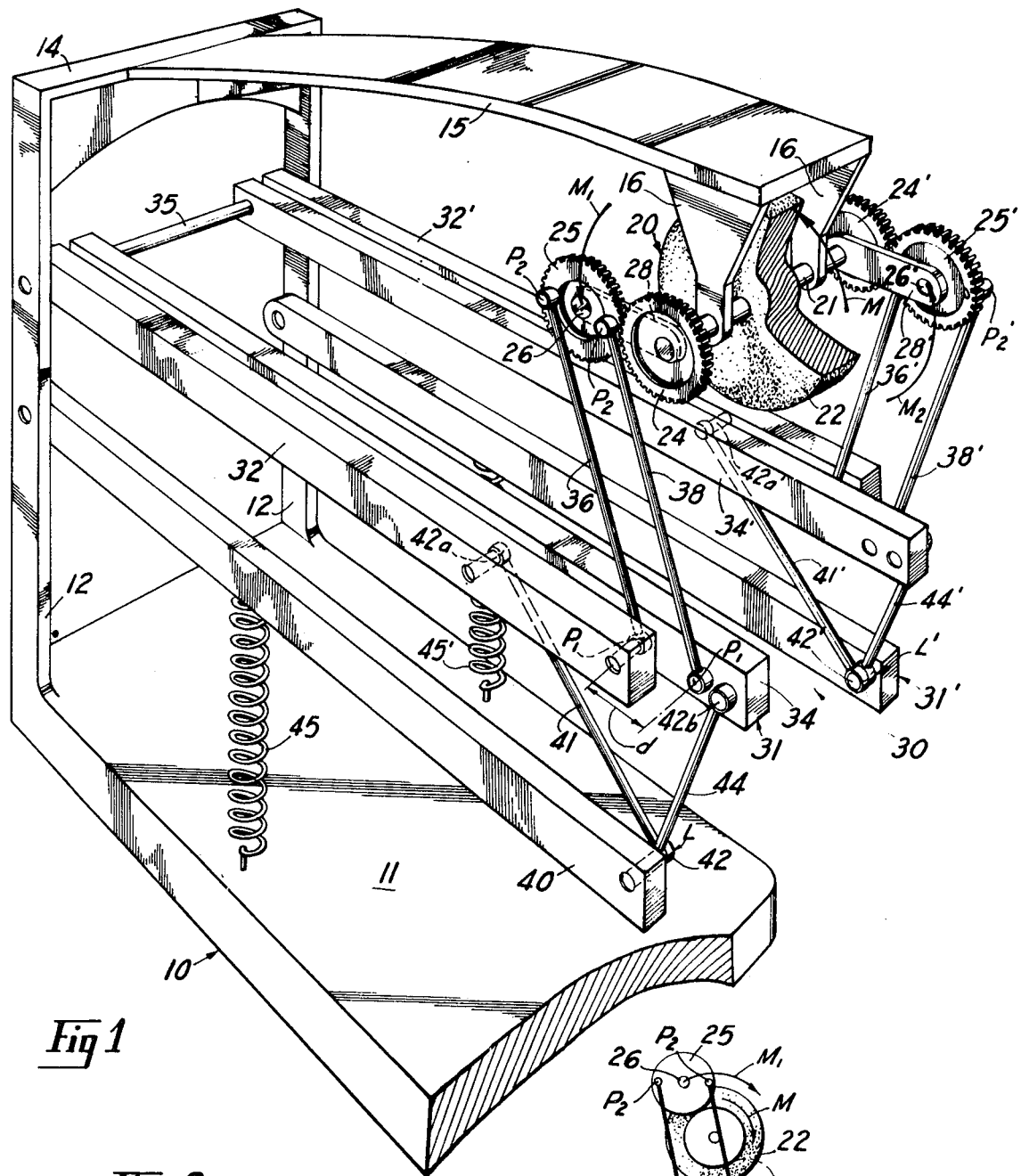
FIG. 1 is a perspective view of one embodiment of the invention.
Figure 2:
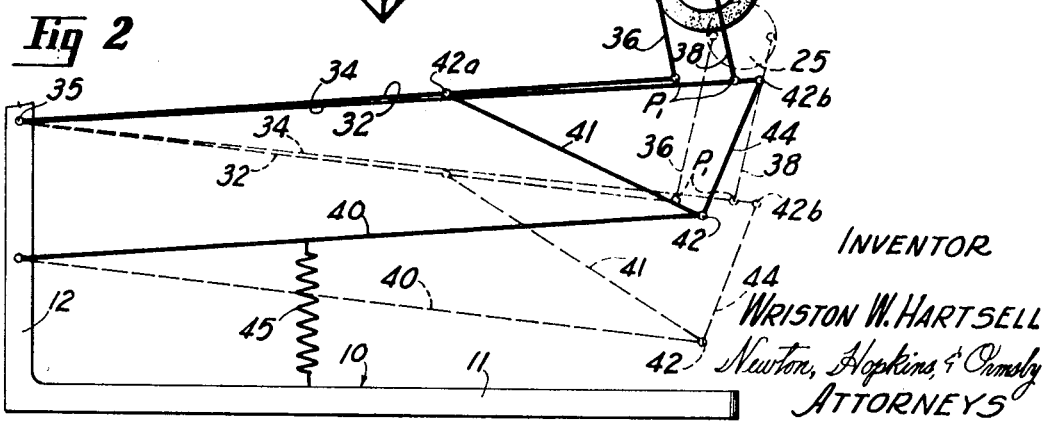
FIG. 2 is a schematic view showing the motions of the embodiment shown in FIG. 1.

Referring to FIG. 1, the apparatus of the invention includes a frame 10, a driven section 20 and a driving section 30. The frame 10 includes a rectangular base 11 having a pair of spaced, upstanding supports 12 extending upwardly from opposite sides of one end of base 11. The supports 12 are joined at their upper ends by a cross brace 14. A mounting plate 15 extends from the center of brace 14 out over base 11 parallel thereto. Depending from the forward end of mounting plate 15 are a pair of spaced bearing blocks 16 which carry the driven section 20 as will be explained.

The driven section 20 includes a driven shaft 21 rotatably mounted in bearing blocks 16 and extending transversely across base 11 thereabove. Centrally mounted on shaft 21 between blocks 16 is a flywheel 22 that is rotated as shaft 21 is rotated. Affixed to the near extending end of shaft 21 is a right sun gear 24 and affixed to the far extending end of shaft 21 is a left sun gear 24' identical to sun gear 24. A right planetary gear 25 is rotatably mounted on spindle 26 carried by planetary arm 28 rotatably carried by shaft 21 just inboard of right sun gear 24. Spindle 26 extends parallel to shaft 21 and arm 28 is so positioned that planetary gear 25 is always in mesh with gear 24 as arm 28 rotates about shaft 21. Likewise, a left planetary gear 25' is mounted in mesh with sun gear 24' by spindle 26' and arm 28' corresponding to gear 25, spindle 26 and arm 28. The flywheel 22 serves as an output member for conventional connection to a device (not shown) to be driven by the invention. It is to be understood that another output member may be used for the same purpose.

The driving section 30 includes a right-hand driving assembly 31 and a left-hand driving assembly 31'. Since assembly 31' is a mirror image of assembly 31, only the right-hand assembly 31 will be described in detail with like components of left-hand assembly 31' being referenced by primes of the numerals applied to assembly 31.

The assembly 31 includes a pair of driving arms 32, 34 rotatably mounted on cross-shaft 35 extending between supports 12 parallel to shaft 21 but spaced therefrom and therebelow. The arm 32 is shorter than arm 34 and terminates approximately vertically under shaft 21 while arm 34 extends thereby. The far side of arm 32 as seen in FIG. 1 is in substantial vertical alignment with the near side of planetary gear 25 and the near side of arm 34 is in substantial vertical alignment with the near side of planetary gear 25.

A first driving rod 36 connects one point $P_1$ on arm 32 with one point $P_2$ on gear 25 adjacent the periphery thereof and a second driving rod 38 connects one point $P_1$ arm 34 with gear 25 at a point $P_2$ diametrically opposite the point at which rod 36 is connected to gear 25. The rods 36 and 38 are equal in length and are pinned to the arms 32 and 34 and gear 25, respectively. The point $P_1$ at which arm 32 is connected to rod 36 is displaced from the point $P_1$ at which rod 38 is connected to arm 34 by a distance $d$, approximately equal to the distance between the points $P_2$ on gear 25 to which rods 36 and 38 are attached. As arms 32 and 34 move synchronously up and down, gear 25 will be driven around sun gear 24 and cause same to rotate thus rotating flywheel 22.

In order to synchronize the movement of arms 32 and 34 a positioning linkage L is provided. The linkage L includes a primary positioning link 40 pivotally mounted at one end thereof on the support 12 under arms 32 and 34. Link 40 has a length such that it extends out under the shaft 21. A first sublink 41 is pinned to the end of link 40 at 42 and is pinned to arm 32 intermediate its ends at 42$a$. A second sublink 44 is also pinned to link 40 at 42 and has its other end pinned to arm 34 at 42$b$ on its extending end thereof. The sublinks 41 and 44 are of such length that point $P_1$ on arm 32 and point $P_1$ on arm 34 are always in substantially the same horizontal plane. A driving spring 45 connects link 40 and base 11 and constantly urges link 40 and thus arms 32 and 34 downwardly.

OPERATION

In operation, the arms 32 and 34 move up as arms 32' and 34' move down and vice versa. Thus, it will be seen that gear 25 moves generally along the line of motion $M_1$ and that gear 25' moves generally along the line of motion $M_2$ which cause the flywheel 22 and shaft 21 to rotate as indicated by arrow M. As gears 25 and 25' are moved around gears 24 and 24', the points $P_2$ of gear 25 are maintained in a substantially horizontal plane by arm 40 through arms 32 and 34 which maintain point $P_1$ on arm 32 in substantially the same horizontal plane as point $P_1$ on arm 34 as the arms are pivoted up and down. Likewise points $P_2{'}$ on gear 25' are also maintained in a substantially horizontal plane by arms 32', 34' and 40' in a manner similar to arms 32, 34 and 40. Once the device is set in motion, it continues to run for long periods of time to drive a device because of the particular linkage and driving rod configuration.

While a specific embodiment of the invention has been disclosed, it is understood that substitutions, modifications, and equivalents may be used without departing from the scope of the invention.

I claim:

1. A rotary motion device including:
   a support
   a driven section including a driven shaft rotatably carried by said support, a flywheel mounted on said shaft, a first driven sun gear mounted on one end of said shaft, a second driven sun gear mounted on the opposite end of said shaft, a first planetary gear rotatably mounted in mesh with said first sun gear, and a second planetary gear rotatably mounted in mesh with said second sun gear; and
   driving means for synchronously moving said planetary gears about said sun gears while maintaining diametrically opposite points on each of said planetary gears in a substantially horizontal plane as said gears are moved.

2. The apparatus of claim 1:
   wherein said driven section further includes a first planetary arm rotatably journaled on said driven shaft adjacent said first driven sun gear for independent rotation on said shaft with respect to said first sun gear, said first planetary arm rotatably mounting said first planetary gear thereon so that said first planetary gear is constantly in mesh with said first sun gear regardless of the rotational position of said first planetary arm; and a second planetary arm rotatably journaled on said driven shaft adjacent said second driven sun gear for independent rotation on said shaft with respect to said second sun gear, said second planetary arm rotatably mounting said second planetary gear thereon so that said second planetary gear is constantly in mesh with said second sun gear regardless of the rotational position of said second planetary arm; and, wherein said driving means includes a first pair of driving arms pivotally connected to said support at a point spaced from said driven shaft, one of said first pair of driving arms pivotally connected to one of said diametrically opposite points on said first planetary gear at its free end and the other of said first pair of driving arms pivotally connected to the other of said diametrically opposite points on said second planetary gear at its free end; a second pair of driving arms pivotally connected to said support at a point spaced from said driven shaft so that said first pair of arms and said second pair of arms pivot along a common axis, one of said second pair of driving arms pivotally connected to one of said diametrically opposite points on said second planetary gear at its free end and the other of said second pair of driving arms pivotally connected to the other of said diametrically opposite points on said second planetary gear at its free end; positioning means for maintaining the free ends of said first pair of driving arms in a substantially horizontal plane as said arms are pivoted and for maintaining the free ends of said second pair of driving arms in a substantially horizontal plane as said arms are pivoted; first spring means for constantly urging said first pair of driving arms away from said first planetary gear; and second spring means for constantly urging said second pair of driving arms away from said second planetary gear.

3. The apparatus of claim 2 wherein said planetary gears are positioned on diametrically opposed sides of said sun gears at all times.

4. The apparatus of claim 3 wherein said positioning means includes:

a first link pivotally connected to said support at a point spaced from said driven shaft and said point at which said first pair of driving arms are pivoted to said support so that said first link pivots about an axis parallel to the pivot axis of said first pair of driving arms, and a first pair of sublinks pivotally connected to a common point on the free end of said first link, the free end of one of said first pair of sublinks pivotally connected to one of said first pair of driving arms and the free end of the other of said first pair of sublinks pivotally connected to the other of said first pair of driving arms so that the free ends of said first pair of driving arms remain in a substantially horizontal plane as said arms and first link are pivoted; and, a second link pivotally connected to said support at a point spaced from said driven shaft and said point at which said second pair of driving arms are pivoted to said support so that said second link pivots about an axis common with said pivot axis of said first link and parallel to the pivot axis of said second pair of driving arms, and a second pair of sublinks pivotally connected to a common point on the free end of said first link, the free end of one of said second pair of sublinks pivotally connected to one of said second pair of driving arms and the free end of the other of said second pair of sublinks pivotally connected to the other of said second pair of driving arms so that the free ends of said second pair of driving arms remain in a substantially horizontal plane as said arms and second link are pivoted.

5. The apparatus of claim 1 wherein said driving means includes first arm means pivoted to said support and connected to said diametrically opposite points on said first planetary gear, first spring means for constantly urging said first arm means away from said driven shaft, second arm means pivoted to said support and connected to said diametrically opposite points on said second planetary gear, and second spring means for constantly urging said second arm means away from said driven shaft.

6. The apparatus of claim 5 wherein said driving means is constructed and arranged to maintain said first and second planetary gears on opposite sides of said sun gears as said planetary gears are moved around said sun gears.